United States Patent
Lewin et al.

(10) Patent No.: US 6,984,693 B2
(45) Date of Patent: Jan. 10, 2006

(54) TWO STAGE CURE TWO COMPONENT COATING COMPOSITION CONTAINING HYDROXYLBUTYL ACRYLATE POLYMERS

(75) Inventors: Laura Ann Lewin, Greenville, DE (US); Brian Patrick Devlin, Berwyn, PA (US); Donald Albert Paquet, Jr., Troy, MI (US); James Lamonte Adams, Glenside, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/837,383

(22) Filed: Apr. 30, 2004

(65) Prior Publication Data

US 2005/0027074 A1 Feb. 3, 2005

Related U.S. Application Data

(60) Provisional application No. 60/492,023, filed on Aug. 1, 2003.

(51) Int. Cl.
*C08L 75/04* (2006.01)

(52) U.S. Cl. .................. 525/125; 525/131; 528/80; 428/423.1; 428/425.8; 427/385.5

(58) Field of Classification Search ................ 525/451, 525/125, 131; 428/423.1, 425.8; 528/80; 427/385.5
See application file for complete search history.

(56) References Cited

U.S. PATENT DOCUMENTS 3,671,293 A 6/1972 Walle
4,413,036 A 11/1983 Drexler et al.
4,680,352 A 7/1987 Janowicz et al.
4,741,932 A 5/1988 Ichimura et al.
5,286,782 A 2/1994 Lamb et al.
5,290,633 A 3/1994 Devlin et al.
5,326,820 A 7/1994 Hoffmann et al.
5,514,755 A 5/1996 Fenn et al.
5,659,136 A 8/1997 Koch et al.
5,741,880 A 4/1998 Valpey, III et al.
5,969,054 A 10/1999 Wamprecht et al.
6,013,739 A 1/2000 Rink et al.
6,221,494 B1 4/2001 Barsotti et al.
6,326,059 B1 12/2001 Lewin et al.
6,471,185 B2 10/2002 Lewin et al.

FOREIGN PATENT DOCUMENTS

WO WO99/23131 5/1999
WO WO00/55233 9/2000
WO WO01/83579 11/2001
WO WO02/088215 11/2002

*Primary Examiner*—Melanie Bissett
(74) *Attorney, Agent, or Firm*—Sudhir G. Deshmukh

(57) ABSTRACT

A two-stage cure coating composition of a binder and a crosslinking component; the binder comprises and acrylic polymer having a weight average molecular weight of 3,000 to 50,000 and hydroxyl moieties in the range of 7.0 to 40.0 weight; wherein at least 40.0 weight percent of the hydroxyl moieties are provided by hydroxy butyl acrylate; the crosslinking component comprises an organic polyisocyanate; and the first stage curing of a finish of the composition forms a water spot free finish within 90 minutes of application and the composition has a pot life of less than a 2 second rise in Zahn cup viscosity in 150 minutes; and the invention also is directed to a method of producing a finish on a substrate utilizing the coating composition.

18 Claims, No Drawings

TWO STAGE CURE TWO COMPONENT COATING COMPOSITION CONTAINING HYDROXYLBUTYL ACRYLATE POLYMERS

CROSS-REFERENCE TO RELATED APPLICATION

This application claims priority under 35 U.S.C. §119 from U.S. Provisional Application Ser. No. 60/492,023 filed on Aug. 1, 2003, which is incorporated by reference herein as if fully set forth.

BACKGROUND OF THE INVENTION

1. Field of the Invention

This invention is directed to a coating composition, in particular, to a two component coating composition particularly useful for automotive refinish applications that has an improved pot life but cures rapidly after application to a substrate.

2. Description of the Prior Art

To meet the many requirements of an exterior finish for automobiles and trucks, the automotive industry currently is using multi-layer finishes on automobile and truck bodies and parts. Typical of these finishes are layers of the following: (1) an electrocoat layer applied over a substrate, typically, a phosphatized cold rolled steel, (2) a primer layer, (3) a colored layer, typically pigmented, and (4) a clear layer. A colored top-coat layer may be used in place of the colored layer and clear layer. The repair or refinishing of such multi-layer finishes of automobiles and trucks usually takes place in collision repair facility, for example, a typical automotive repair shop. These facilities generally do not have high temperature ovens but rely on ambient temperature curing, curing with heat lamps, or the use of enclosures that can be heated with forced hot air.

The typical repair coatings that are used are two component compositions that are mixed just prior to spray application. The "pot life" of these coatings is of sufficient length that at least the repair or refinish of the vehicle can be completed and preferably more than one vehicle can be refinished. "Pot life" is the length of time a composition remains at a viscosity at which it can be applied by spraying using conventional equipment. The cure time of these repair coatings must be relatively short so the coated automobile, truck or body part can be move from the area where it is being cured and then must harden in a relatively short time so that it can be polished, sanded or additional coatings, stripes or decals can be applied.

Using conventional formulation techniques, the cure time of a two component coating composition can be reduced by the use of catalyst but a catalyst also shortens the pot life of the composition and often adversely affects the appearance of the resulting finish since the coating after application requires time to flow to form a smooth glossy finish. To improve flow and appearance of the resulting finish, solvents or diluents can be added but these components increase the VOC (volatile organic content) of the coating composition, which according to current air pollution regulations must be kept at a VOC level, which is set forth in local regulation, usually in the range of 2–4 #/gal.

Useful two stage cure coating compositions are disclosed in Lewin et al. U.S. Pat. No. 6,326,059 and Lewin et al. U.S. Pat. No. 6,471,185. Both of these patents require the use of a secondary amine, in particular, tertiary butylamino ethyl methacrylate, for curing. Such amines often cause yellowing of a coating on aging and are very reactive which reduces the pot life of the coating composition and therefore, only restricted amounts of these amines can be used in the coating composition.

It would be desirable to be able to formulate a two component coating composition that has short cure time so that a finish of the coating composition can be sanded or buffed in a relatively short period after application thereby increasing productivity of an automotive or truck refinish facility and still have an excellent appearance and such a coating composition also should have and extended pot life.

SUMMARY OF THE INVENTION

The present invention is directed to a two-stage cure coating composition comprising a two component composition of a binder and a crosslinking component, wherein the binder comprises an acrylic polymer having a weight average molecular weight of 3,000 to 50,000 and hydroxyl moieties in the range of 7.0 weight percent to 40.0 weight percent, based on the weight of the acrylic polymer; wherein at least 40.0 weight percent of the hydroxyl moieties are provided by hydroxy butyl acrylate; and the crosslinking component comprises an organic polyisocyanate having at least two reactive isocyanate groups; and wherein the first stage curing of a finish of the composition on a substrate forms a water spot free finish within 90 minutes of application and wherein the composition has a pot life, measured on a composition having 38% solids of binder and crosslinking component at 25° C., of less than a 2 second rise in Zahn cup viscosity in 150 minutes.

The present invention also is directed to a method of producing a finish on a substrate utilizing a two component coating composition; wherein the method comprises the following steps:

a. Forming a two stage cure coating composition by mixing together a binder component of the coating composition and a cross-linking component of the composition comprising an organic polyisocyanate, wherein the binder component comprises an acrylic polymer having in the range of 7.0 to 40.0 weight percent, based on the weight of the acrylic polymer, of hydroxyl moieties and at least 40.0 weight percent of the hydroxyl moieties are provided by hydroxyl butyl acrylate and the coating composition has pot life measured as above of less than a 2 second rise in Zahn cup viscosity in 150 minutes;

b. Applying a layer of the coating composition over the substrate;

c. First stage curing the layer on the substrate to a water spot free finish within 90 minutes after application; and d. Second stage curing thereafter the first stage cured layer on the substrate into a finish having excellent appearance and excellent physical properties, such as, mar and etch resistance.

DETAILED DESCRIPTION OF THE INVENTION

An advantage of the coating composition of this invention is that the finish resulting there-from has a rapid first stage cured state (defined below) obtained under ambient conditions or slightly elevated temperature conditions, e.g., up to about 80° C., when compared to finishes obtained from conventional coating compositions.

Another advantage of this invention is that a finish resulting there-from provides excellent second stage-cured state (defined below) necessary to achieve an excellent appearance, such as, gloss and lack of orange peel, and has the desired properties, e.g., etch and mar resistance.

Still another advantage of this invention is that it requires substantially low amounts of solvent needed for efficient spray application, thus enabling the formulator, especially in the United States, to meet the increasingly stringent legal VOC requirements in regard to acceptable level of release of organic volatiles to the atmosphere.

Yet, still another advantage of the coating composition of the present invention is that it has an extended pot life as compared to conventional rapid curing coating compositions.

The novel coating composition also advantageously permits a formulator to select from a wide selection of other film forming polymers that can be incorporated in the coating composition.

The following terms used herein and are defined as follows:

"Two-component composition" means a thermosetting coating composition comprising two components stored in separate containers. In this invention, the two components are the binder of an acrylic polymer having reactive hydroxyl groups and a crosslinking component of a polyisocyanate. These containers are typically sealed to increase the shelf life of the components of the coating composition. The components are mixed prior to use to form a pot mix. The pot mix is applied as a layer, typically through a spray nozzle, to the desired thickness on a substrate surface, such as an auto or truck body. After application, the layer is cured under ambient conditions or cured at slightly elevated temperatures (up to 80° C.) and under the first stage of cure forms a water spot free finish within 90 minutes after application and thereafter, under the second stage of cure, forms a finish on the substrate having desired properties, such as, appearance, e.g., high gloss, and physical properties, like mar-resistance and resistance to environmental etching.

"Pot life" is the length of time the pot mix remains in a sprayable condition and is determined by measuring the viscosity increase of the pot mix. The viscosity increase must be less than a 2 second rise in Zahn Cup viscosity in 150 minutes and preferably in up to 500 minutes using a No. 2 Zahn cup measured on a 38% solids composition at 25° C.

"Water Spot Free Finish" means when the finish is free of any evidence of water spotting or distortion due to water and is determined by applying a drop of deionized water about ½ inch in diameter on a coated panel at various time intervals such as, 30 minutes, 60 minutes, 90 minutes and the like after the finish has been applied to the panel. To be acceptable as a refinish composition, the coating compositions of this invention must form a water spot free finish within 90 minutes after application to a substrate.

"First stage cure" under ambient conditions or slightly elevated temperature conditions (up to 80° C.) occurs when a layer of a coating composition upon application cures sufficiently within a very short, within 90 minutes after application, to form a water spot free finish that provides a surface that can be readily buffed or sanded without fouling the sanding paper.

"Second stage cure" of the first stage cured layer under ambient conditions occurs within several days (generally about 2 days to about 10 days) to produce a fully cured finish that has excellent physical properties, e.g., is tough, hard and resistant to marring, scratching and etching and has the desired appearance, such as, good gloss (80 and above measured with a standard glossimeter at an angle of 20 degrees). If desired, the second cure time can be shortened to about 12 hours to 48 hours by a low temperature bake of about 60 to 15 minutes at about 60° C. to 80° C.

"Number average molecular weight" and "weight average molecular weight also referred to herein as "GPC weight average molecular weight" and "GPC number average molecular weight" means a weight average molecular weight (Mw) and a number average molecular weight (Mn), respectively measured by utilizing gel permeation chromatography. A high performance liquid chromatograph (HPLC) supplied by Hewlett-Packard; Palo Alto, Calif. was used. Unless stated otherwise, tetrahydrofuran was used as the liquid phase and polystyrene was used as the standard.

"Polydispersity" of a polymer is a ratio of Mw to Mn.

"(Meth)acrylate" means methacrylate and acrylate.

"Polymer solids" or "composition solids" means a polymer or composition in its dry state.

"Low VOC coating composition" means a coating composition that includes the range of from 0.1 kilograms (1.0 pounds per gallon) to 0.72 kilograms (6.0 pounds per gallon), preferably 0.3 kilograms (2.6 pounds per gallon) to 0.6 kilograms (5.0 pounds per gallon) and more preferably 0.20 kilograms (2.0 pounds per gallon) to 0.48 kilograms (4.0 pounds per gallon) of the solvent per liter of the coating composition. All VOC's determined under the procedure provided in ASTM D3960.

"High solids composition" means a coating composition having solid component of above 30 percent, preferably in the range of from 35 to 90 percent and more preferably in the range of from 40 to 80 percent, all in weight percentages based on the total weight of the composition.

"Tg" (glass transition temperature) measured in IC determined by DSC (Differential Scanning Calorimetry).

"Polymer solids" or "Binder solids" means a polymer or binder in its dry state.

The novel composition of this invention has an excellent pot life of at least 90 minutes and up to 500 minutes. A layer from the novel composition of this invention dries rapidly to the first stage cure at ambient temperatures. Thereafter, within a few days, the first stage cured layer fully cures (the second stage cure) at ambient temperatures to produce a hard, glossy, tough finish. This is particularly advantageous in refinishing automobiles and trucks. For example, in repairing a clear coat/color coat finish of an automobile or truck, generally the color coat is applied and dried for a short time but not cured and then the clear coat is applied and both coats are cured, all at ambient temperatures. If necessary, the cured clear coat is sanded and buffed to improve appearance and remove minor imperfections. For a clear finish to be sandable and buffable, it must be hard but not tough. Since, the coating composition of this invention has a short first stage cure time; the rate of processing vehicles through a typical repair facility can be substantially increased. Thus, the vehicle can be moved out of the spray booth area to provide room for another vehicle to be painted and then buffed or sanded as required. Similarly, if the present composition is used as a primer, it can be sanded in a short period of time after application and a topcoat can then be applied on top of the sanded surface.

These advantages of the novel composition are the result of having a reactive hydroxy functional groups on the acrylic polymer utilized in the coating composition. There are three levels of reactivity of the hydroxy functional groups thereby allowing the tailoring of the reactivity of the coating composition to provide an early cure (first stage cure) to allow for buffing or sanding in a relatively short period after application and a slower later cure (second stage cure) that improves pot life of the composition and appearance of the resulting finish. Hydroxy butyl acrylate provides fast curing highly reactive hydroxy groups and at least 40 weight percent of the hydroxy moieties are provided by hydroxy butyl acrylate. Preferably, 40 to 70 weight percent, more preferably, 42 to 60 weight percent and most preferably, 45 to 60 weight percent of the hydroxy moieties are provided by hydroxy butyl acrylate. Fast reacting hydroxy groups are typically provided by hydroxy ethyl methacrylate and hydroxy ethyl acrylate and also contribute to the fast curing (stage one) curing of the composition. Slower reacting hydroxy groups that improve pot life and finish appearance typically are provided by secondary hydroxyl groups from hydroxy propyl methacrylate and hydroxy propyl acrylate.

A coating composition containing only highly reactive hydroxy groups from hydroxy butyl acrylate will have an unacceptably short pot life. Applicants have discovered that by utilizing a certain amount of such highly reactive hydroxy groups and fast reacting hydroxy groups in combination with slow reacting hydroxy groups provided, for example, by hydroxy propyl methacrylate, the reactivity of the polymer in the coating composition is altered and makes it possible to produce a coating composition that has an acceptable pot life and still produce coatings having an acceptable first stage cure time and excellent second stage curing to provide a finish with excellent appearance and excellent physical properties. When the dual cure coating composition of the present invention is applied over a substrate and after solvent evaporates during the drying process, the highly reactive and fast acting hydroxy moieties in the polymer become available to rapidly react with the crosslinking agent and form a crosslinked finish that is tack free in a short period of time. The slow reacting hydroxy groups of the polymer thereafter react with the crosslinking agent to attain second stage cure in a relatively short time at ambient temperatures to produce a coating having hard durable finish with an excellent appearance and excellent coating properties.

The coating composition of the present invention is a two-pack coating composition that includes a binder component and a crosslinking component. These components are stored separately, for example, in separate containers and are mixed just prior to use to form a pot mix. The coating composition generally includes in the range of 40 weight percent to 95 weight percent of the binder component comprising an acrylic polymer and includes in the range of 5 weight percent to 60 weight percent of the crosslinking component, all percentages being based on the film forming composition solids. Preferably, the coating composition contains 50 weight percent to 90 weight percent of the binder component and 10 weight percent to 50 weight percent of the crosslinking component and more preferably, the coating composition contains 65 weight percent to 85 weight percent of the binder and 15 weight percent to 35 weight percent of the crosslinking component, all percentages being based on the film forming composition solids.

The binder component can be all acrylic polymer but includes in the range of 30 weight percent to 90 weight percent, preferably in the range of 40 weight percent to 80 weight percent, and more preferably in the range of 50 weight percent to 70 weight percent of an acrylic polymer, with the complementary percentages being a polyester, a second acrylic polymer, polyesterurethane, or a polyurea, all percentages being based on the binder component solids.

To achieve the reactivity and the two stage curing, the fast reacting hydroxy groups are provided by hydroxy butyl acrylate. To provide the desired level of fast curing hydroxy groups to the acrylic polymer, about 3 to 30 weight percent, preferably, 10 to 20 weight percent and more preferably, 12 to 18 weight percent, based on the weight of the acrylic polymer, of hydroxy butyl acrylate is used. Additionally, fast reacting hydroxy groups are provided, for example, by hydroxy ethyl methacrylate and hydroxy ethyl acrylate and can be present in amounts of about 10 to 25 weight percent, based on the weight of the acrylic polymer. The slower reacting hydroxy groups are provided, for example, by hydroxy propyl methacrylate or hydroxy propyl acrylate or mixtures thereof can be present in amounts of about 5 to 15 weight percent, based on the weight of the acrylic polymer.

The acrylic polymer includes other monomers that are typically used to provide desired properties, such as glass transition temperature of −20° C. and above. Typically useful monomers and mixtures thereof include styrene, alkyl styrene; vinyl toluene; acrylonitrile; alkyl (meth)acrylates having 1–18 carbon atoms in the alkyl group, such as methyl (meth)acrylate, ethyl (meth)acrylate, propyl (meth)acrylate, isopropyl (meth)acrylate, butyl (meth)acrylate, pentyl (meth)acrylate, hexyl (meth)acrylate, 2-ethyl hexyl (meth) acrylate, nonyl (meth)acrylate, lauryl (meth)acrylate, stearyl (meth)acrylate; cycloaliphatic (meth)acrylates, such as cyclohexyl (meth)acrylate, trimethylcyclohexyl (meth)acrylate, isobutylcyclohexyl (meth)acrylate and isobornyl (meth)acrylate; aryl (meth)crylates, such as benzyl (meth) acrylate; or any combination thereof. Methacrylates of methyl, butyl, n-butyl, and isobornyl are preferred.

The acrylic polymer suitable for use may be a linear polymer, a branched polymer, a core-shell polymer, or a combination thereof. The linear acrylic polymer is preferred. Applicants also unexpectedly discovered that to attain the afore-described application productivity advantages, the acrylic polymer preferably has a molecular weight and a Tg in a certain range. Thus, the acrylic polymer which may be a linear or branched acrylic polymer has a weight average molecular weight (Mw) varying in the range of from 3,000 to 30,000, preferably varying in the range of from 3,000 to 20,000, more preferably varying in the range of from 3,000 to 15,000 and a Tg varying in the range of from −20° C. to 100° C., preferably varying in the range of from 0° C. to 90° C., and more preferably varying in the range of from 20° C. to 80° C.

Linear acrylic polymers can be produced by conventional processes well known in the art. Typically, solvent is added to a reactor and brought to reflux at elevated temperatures under an inert gas blanket, typically nitrogen gas. Optionally, before adding heat, the reactor may be fed with a portion of the monomer mixture and one or more typical initiator, such as the azo type catalysts, which include 2,2'-azobis (2,4 dimethylpentane nitrile); peroxides, such as, di-tertiarybutyl peroxide; and hydroperoxides. Commercially available peroxy type initiator t-butylperoxide or Triganox® B from AKZO NOBEL is suitable for use in the present invention. Upon attaining the desired polymerization temperature, the initiator and the monomer mixture are simultaneously fed to the reactor over a period of time. Optionally, a shot of hydroxy containing monomer may be added towards the end of polymerization. Sometimes, it is also desirable to add additional initiator upon completion of addition of the monomer mixture to ensure completion of the polymerization process.

The afore-described acrylic resin may be conventionally prepared in accordance with the process disclosed in the U.S. Pat. No. 5,286,782, which is incorporated herein by reference.

A branched acrylic polymer can be produced by a polymerization process, described in U.S. Pat. Nos. 4,680,352 and 5,290,633, which are incorporated herein by reference. Typically, the branched polymers are made in two stages. In the first stage, macromonomers, using conventional cobalt (II) or (III) chelate chain transfer agent, are produced to ensure that the macromonomer is provided with one terminal ethylenically unsaturated group, which is polymerizable. During the second stage, the monomer mixture described earlier is added to the reactor containing the macromonomers. The monomers polymerize with the ethylenically unsaturated group on the macromonomer to produce the branched acrylic polymer.

The core-shell polymer has a solvent insoluble core, and a solvent soluble shell, chemically attached to the core. Preferably, the shell is in the form of macromonomer chains or arms attached to it. The core-shell polymer is a polymer particle dispersed in an organic media, wherein the polymer particle is stabilized by what is known as steric stabilization. The average particle size of the core ranges from 0.1 to 1.0 microns and preferably, from 0.15 to 0.6.

The core-shell polymer includes in the range of from about 10 percent to 90 percent, preferably in the range of from 50 percent to 80 percent, all in weight percent based on the weight of the dispersed polymer, of a core formed from high molecular weight polymer having a weight average molecular weight of about 50,000 to 500,000, preferably in the range of from 50,000 to 200,000, more preferably in the range of from 50,000 to 150,000. The shell of the polymer are arms that make up about 10 percent to 90 percent, preferably 20 percent to 50 percent, all in weight percent based on the weight of the core-shell polymer. The arms are formed from a low molecular weight polymer having weight average molecular weight in the range of from about 1,000 to 50,000, preferably in the range of from 2,000 to 40,000, more preferably in the range of from 3,000 to 30,000.

The core of the dispersed core-shell polymer is comprised of one or more polymerized acrylic monomers. Suitable monomers include the aforementioned hydroxy alkyl (meth)acrylate) containing monomers, styrene, alkyl (meth)acrylate having alkyl carbon atoms in the range of from 1 to 18, preferably in the range of from 1 to 12; ethylenically unsaturated mono-carboxylic acids, such as, (meth)acrylic acid, silane-containing monomers, and epoxy containing monomers, such as glycidyl (meth)acrylate. Other optional monomers include amine containing monomers, or acrylonitrile. Optionally, the core may be crosslinked through the use of diacrylates or dimethacrylates, such as, allyl methacrylate or through post reaction of hydroxyl moieties with polyfunctional isocyanates or carboxylic moieties with epoxy moieties.

The macromonomer arms attached to the core are polymerized from the hydroxyl alkyl (meth)acrylate monomers, described above. In addition, the arms may be polymerized from monomers, such as styrene and alkyl(meth)acrylates having 1 to 12 carbon atoms.

The process for making the core-shell polymer is described in U.S. Pat. No. 5,659,136, which is incorporated herein by reference.

The crosslinking component of the coating composition of the present invention includes one or more crosslinking agents having at least two isocyanate groups, such as a polyisocyanate crosslinking agent. Any of the conventional aromatic, aliphatic, cycloaliphatic, isocyanates, trifunctional isocyanates and isocyanate functional adducts of a polyol and a diisocyanate can be used. Typically useful diisocyanates are 1,6-hexamethylene diisocyanate, isophorone diisocyanate, 4,4'-biphenylene diisocyanate, toluene diisocyanate, bis cyclohexyl diisocyanate, tetramethylene xylene diisocyanate, ethyl ethylene diisocyanate, 2,3-dimethyl ethylene diisocyanate, 1-methyltrimethylene diisocyanate, 1,3-cyclopentylene diisocyanate, 1,4-cyclohexylene diisocyanate, 1,3-phenylene diisocyanate, 1,5-naphthalene diisocyanate, bis-(4-isocyanatocyclohexyl)-methane and 4,4'-diisocyanatodiphenyl ether. Typical trifunctional isocyanates include triphenylmethane triisocyanate, 1,3,5-benzene triisocyanate and 2,4,6-toluene triisocyanate. Trimers of diisocyanates also can be used, such as the trimer of hexamethylene diisocyanate, which is supplied by Bayer Corporation, Pittsburgh, Pa., under the trademark Desmodur® N-3390. Other suitable polyisocyanates from Bayer Corporation include Desmodur® N-3300 and Z-4470BA polyisocyanates.

The relative amount of crosslinking agent used in the coating composition is adjusted to provide a molar equivalent ratio of NCO/(OH) in the range of from 0.5 to 2.0, preferably in the range of from 0.75 to 1.5 and more preferably, in the range of from 0.85 to 1.25.

The coating composition preferably includes one or more catalysts to enhance crosslinking of the components during curing. Generally, the coating composition includes in the range of from 0.005 percent to 2 percent, preferably in the range of from 0.01 to 1 percent and more preferably in the range of from 0.02 percent to 0.7 percent of the catalyst, the percentages being in weight percentages based on the total weight of the binder and crosslinking component solids. These catalysts are preferably added to the binder component.

Some of the suitable catalysts for polyisocyanates can include one or more tin compounds, tertiary amines or a combination thereof, and one or more acid catalysts known to those skilled in the art. Suitable tin compounds include dibutyl tin dilaurate, dibutyl tin diacetate, stannous octoate, and dibutyl tin oxide. Dibutyl tin dilaurate is preferred. Suitable tertiary amines include triethylene diamine. One commercially available catalyst that can be used is Fascat® 4202, dibutyl tin dilaurate, sold by Elf-Atochem North America, Inc. Philadelphia, Pa.

The pot life of the coating composition containing the afore-described catalyst can be extended by adding in the range of from 0.1 weight percent to 2.0 weight percent, preferably in the range of from 0.15 weight percent to 1.0 weight percent and more preferably in the range of from 0.2 weight percent to 0.5 weight percent, based on the weight of the binder and crosslinking agent, of a pot life extending agent. One of the suitable pot life-extending agents is a carboxylic acid, such as, acetic acid, propionic acid, butyric acid, lauric acid. Acetic acid is preferred.

If desired, the binder component of the coating composition may also include one or more oligomers in amounts of 1 to 20 weight percent, based on the weight of the binder and crosslinking agent. These oligomers typically have a weight average molecular weight (Mw) in the range of from 100 to 3,000, preferably in the range from 500 to 1,500, a polydispersity in the range of from 1.01 to 1.70, preferably, in the range of 1.05 to 1.50 and more preferably, in the range from 1.10 to 1.30, and having one or more isocyanate reactive functionalities. The oligomer preferably includes in the range from 2 to 12, more preferably in the range from 2 to 8 and most preferably in the range from 2 to 6 isocyanate reactive functionalities. The suitable isocyanate reactive functionalities include a hydroxyl group, epoxy group or a combination thereof.

Typically useful acrylic oligomers comprise the same or similar constituents of the aforementioned acrylic polymers. Examples of such acrylic oligomers are hydroxyethyl methacrylate/hydroxy butyl acrylate/isobornyl acrylate and hydroxyethyl methacrylate/hydroxy propyl methacrylate/hydroxy butyl acrylate/isobornyl acrylate;

Polyester oligomers also can be used and can be produced by first reacting a multifunctional alcohol, such as, pentaerythritol, hexandiol, trimethyol propane with alicyclic monomeric anhydrides, for example, hexahydrophthalic anhydride or methylhexahydrophthalic anhydride to produce an oligomeric acid. Oligomeric acids having at least one hydroxyl functionality are also suitable, prepared by reacting the multifunctional alcohol with less than a stochiometric amount of the monomeric anhydride.

The oligomeric acid is then reacted with a monofunctional epoxy under pressure at a reaction temperature in the range of from 60° C. to 200° C. Typical reaction time is in the range of from 1 hour to 24 hours, preferably, 1 hour to 4 hours. The foregoing two-step process ensures that the hydroxyl functionalities are uniformly distributed on each oligomeric chain of the reactive oligomer to produce the reactive oligomers with the polydispersity in the range described earlier. Monofunctional epoxy oligomer suitable for use in the present invention include alkylene oxide of 2 to 12 carbon atoms, ethylene, propylene and butylene oxides are preferred, ethylene oxide is more preferred. Other epoxies, such as, Cardura® E-10 glycidyl ester, supplied by Resolution Performance Products, Houston, Tex. may be used in conjunction with the monofunctional epoxies, described above. The details of producing the oligomer are described in a PCT Publication WO 99/23131, which was published on May 14, 1999. Said publication is incorporated herein by reference.

If desired, the binder of the coating composition may include a second acrylic resin, similar in composition to the above-described acrylic polymers, a polyester or a combination thereof. The acrylic resin and/or the polyester have at least one or more of the afore-described isocyanate reactive functionalities, a weight average molecular weight (Mw) varying in the range of from 2500 to 20,000, preferably varying in the range of from 3000 to 10,000 and a Tg varying in the range of from −20° C. to 100° C., preferably, varying in the range of from 0° C. to 90° C. and more preferably, varying in the range of from 20° C. to 80° C.

Polyesters suitable for use in the present invention may be any conventional polyester conventionally polymerized from polyacids, including cycloaliphatic polycarboxylic acids, and suitable polyols, which include polyhydric alcohols. Examples of suitable polyacids are cycloaliphatic polycarboxylic acids, such as, tetrahydrophthalic acid, hexahydrophthalic acid, 1,2-cyclohexanedicarboxylic acid, 1,3-cyclohexanedicarboxylic acid, 1,4-cyclohexanedicarboxylic acid, 4-methylhexahydrophthalic acid, endomethylenetetrahydrophthalic acid, tricyclodecanedicarboxylic acid, endoethylenehexahydrophthalic acid, camphoric acid, cyclohexanetetracarboxylic acid and cyclobutanetetracarboxylic acid. The cycloaliphatic polycarboxylic acids can be used not only in their cis but also in their trans form or a mixture thereof. Examples of suitable other polycarboxylic acids, which, if desired, can be used together with the cycloaliphatic polycarboxylic acids, are aromatic and aliphatic polycarboxylic acids, such as, phthalic acid, isophthalic acid, terephthalic acid, halogenophthalic acids, such as, tetrachloro- or tetrabromophthalic acid, adipic acid, glutaric acid, azelaic acid, sebacic acid, fumaric acid, maleic acid, trimellitic acid, and pyromellitic acid.

Suitable polyhydric alcohols that can be used to form the polyesters include ethylene glycol, propanediols, butanediols, hexanediols, neopentylglycol, diethylene glycol, cyclohexanediol, cyclohexanedimethanol, trimethylpentanediol, ethylbutylpropanediol, ditrimethylolpropane, trimethylolethane, trimethylolpropane, glycerol, pentaerythritol, dipentaerythritol, tris(hydroxyethyl)isocyanate, polyethylene glycol and polypropylene glycol. If desired, monohydric alcohols, such as, butanol, octanol, lauryl alcohol, ethoxylated or propoxylated phenols may also be included along with polyhydric alcohols. The details of polyester suitable for use in the present invention are further provided in the U.S. Pat. No. 5,326,820, which is incorporated herein by reference. One example of the commercially available polyester suitable for use is SCD-1040 polyester, which is supplied by Etna Product Inc., Chagrin Falls, Ohio.

The following are suitable solvents that can be used to form the acrylic polymer and other polymers that may be used in the novel coating composition and can be used to reduce the coating composition to the desired viscosity required, for example, for spray application. These solvents include aromatic hydrocarbons, such as, petroleum naphtha or xylenes; esters, such as, butyl acetate, t-butyl acetate, isobutyl acetate or hexyl acetate; and glycol ether esters, such as, propylene glycol monomethyl ether acetate. The amount of organic solvent added depends upon the desired solids level as well as the desired amount of VOC of the composition. If desired, the organic solvent may be added to both the components of the coating composition.

The amount of solvent added to the coating composition may be adjusted to provide the composition with a VOC (volatile organic content) in the range of from 0.12 kg/l (1.0 pounds per gallon) to 0.72 kg/l (6.0 pounds per gallon) of the solvent per liter of the coating composition.

The coating composition of the present invention may also contain conventional additives, such as stabilizers, and rheology control agents, flow agents, and toughening agents. Typically useful conventional formulation additives include leveling and flow control agents, for example, Resiflow®S (polybutylacrylate), BYK® 320 and 325 (high molecular weight polyacrylates), BYK® 347 (polyether-modified siloxane) and rheology control agents, such as, fumed silica. Such additional additives will, of course, depend on the intended use of the coating composition. Any additives that would adversely affect the clarity of the cured coating will not be included when the composition is used as a clear coating. The foregoing additives may be added to either component or both, depending upon the intended use of the coating composition.

To improve weatherability of the coating, 0.1 to 5 weight percent, preferably 0.5 to 2.5 weight percent and more preferably 1 to 2 weight percent of ultraviolet light stabilizers screeners, quenchers and antioxidants can be added to the composition, the percentages being based on the total weight of the binder and crosslinking components solids. Typical ultraviolet light screeners and stabilizers include the following:

Benzophenones, such as, hydroxy dodecycloxy benzophenone, 2,4-dihydroxy benzophenone, and hydroxy benzophenones containing sulfonic acid groups.

Benzoates, such as, dibenzoate of diphenylol propane and tertiary butyl benzoate of diphenylol propane.

Triazines, such as, 3,5-dialkyl-4-hydroxyphenyl derivatives of triazine and sulfur containing derivatives of dialkyl-4-hydroxy phenyl triazine, hydroxy phenyl-1,3,5-triazine.

Triazoles, such as, 2-phenyl-4-(2,2'-dihydroxy benzoyl)-triazole and substituted benzotriazoles, such as hydroxyphenyltriazole.

Hindered amines, such as, bis(1,2,2,6,6 entamethyl-4-piperidinyl sebacate) and di[4(2,2,6,6, tetramethyl piperidinyl)]sebacate; and any mixtures of any of the above.

Typically, the composition contains pigments in a pigment to binder weight ratio of 1/100 to 350/100. If the coating composition is used as a base-coat or top-coat coating composition, inorganic and organic colored pigments, metallic flakes and powders, such as, aluminum flake and aluminum powders; special effects pigments, such as, coated mica flakes, coated aluminum flakes colored pigments may be used usually in combination with one of the following pigments. If the coating composition is used as a primer, conventional primer pigments are used in a pigment to binder weight ratio of 150/100 to 350/100. Typical of such pigments that are useful in primers are titanium dioxide, zinc phosphate, iron oxide, carbon black, amorphous silica, high surface area silica, barium sulfate, talc, chromate pigments for corrosion resistance, such as, calcium chromate, strontium chromate, zinc chromate, magnesium chromate, barium chromate and hollow glass spheres. These pigments are dispersed using conventional dispersing techniques, such as, ball milling, sand milling, attritor grinding, and the like.

In use, the first-pack of the two-pack coating composition containing the binder component having pigments dispersed therein, if the composition is pigmented, and the second-pack containing the crosslinking component are mixed just prior to use or about 5 to 30 minutes before use to form a pot mix. A layer of the pot mix is typically applied to a substrate by conventional techniques, such as, spraying, electrostatic spraying, roller coating, dipping or brushing. Generally, a layer having a thickness in the range of from 25 micrometers to 75 micrometers is applied over a metal substrate, such as automotive body, which is often pre-coated with other coating layers, such as an electrocoat, primer and a basecoat.

In applying a clear coating composition to a vehicle such as an automobile or a truck for a repair or repainting, the basecoat, which may be either a solvent based composition or a waterborne composition, is first applied and then dried to at least remove solvent or water before the clear coat is applied usually by conventional spraying. Electrostatic spraying also may be used. The clear coat is dried at ambient temperatures but moderately higher temperatures of up to about 80° C. can be used. As soon as the clear finish is dust free and tack free the vehicle can be moved from the work area to allow for the refinishing of another vehicle.

Within 90 minutes after application, the layer from the pot mix of the coating composition cures to the first stage, i.e., it is sufficiently cured to allow for buffing and polishing, if needed, to remove imperfections and improve gloss of the finish. The first stage cured layer continues to cure and after several days, it reaches a level of hardness and toughness required for a durable and weatherable automotive finish, i.e., the coating reaches the second stage cured state.

The coating composition of the present invention is suitable for use as a clear or pigmented composition. The composition can be pigmented with conventional pigments, including metallic flakes and can be used as a monocoat or as a basecoat or as a primer.

The coating composition of the present invention is suitable for providing coatings on a variety of substrates, such as metal, wood and concrete substrates and resinous surfaces, such as, for example, RIM (reaction injection molded) auto bumpers and dashboards. The present composition is suitable for providing clear or pigmented coatings in automotive OEM (original equipment manufacturer) applications and especially suitable for refinish applications typically used in making repairs and touch-ups to automotive bodies. Obviously, the coating composition is also well suited for use in other applications, such as, coating truck bodies, boats, airplanes, tractors, cranes and other metal bodies. The coating composition of the present invention is also suitable for use in industrial and maintenance coating applications.

Testing Procedures used in the Examples

Water Spot Free Finish Time is the time after application of the finish to a substrate that is required to form a finish that is free of any evidence of water spotting or distortion due to water. A primed steel panel is spray coated with a layer of the coating composition. A drop of deionized water is applied after to the layer at time intervals of 30 min., 60 min., 90 min., 120 min., 150 min., 180 min., 210 min., and 240 min. The water drop is applied with a pipette and the size of the drop is about ½ inch in diameter. After each set interval the drop is wiped off with a dry cheese cloth and the spot examined for evidence of water spotting or distortion. The following rating scale was used:

10—No evidence of spotting or distortion
9—Barely detectable
8—Slight ring
7—Very slight discoloration or slight distortion
6—Slight loss of gloss or slight discoloration
5—Definite loss of gloss or discoloration
4—Slight etching or definite distortion To be acceptable, the coating composition of this invention must have a rating of above 9 and form a water spot free finish within 90 minutes after application to a substrate.

Pot Life is the length of time the pot mix (mixture of binder and crosslinking component) remains in a sprayable condition and is determined by measuring the viscosity increase of the pot mix over a period of time. The viscosity of the pot mix is measured after thorough mixing of the binder and crosslinking component with a No. 2 Zahn cup and then measured again after a set interval of time. An acceptable Pot Life is when the coating composition exhibits a rise in viscosity of not more than 2 seconds during a 150 minute period measured by using a No. 2 Zahn cup on a 38% solids composition at 25° C.

Swell Ratio Test—Freestanding films from coating compositions (removed from thermoplastic polyolefin substrates) were placed between two layers of aluminum foil and using a punch, discs of about 3.5 mm diameter were punched out from the films. The aluminum foil was removed from either side of the disc. Using a microscope with 10 times magnification and a filar lens, the unswollen diameter ($D_o$) of the film disc was measured. Four drops of methylene chloride were added to the film, the film was allowed to swell for a few seconds and then a glass slide was placed over it and its diameter was measured again ($D_s$). The swell ratio was then calculated as:

Swell ratio=$(D_s)^2/(D_o)^2$

Swell ratio should not exceed 2 in a 24 hour period.

Tg (glass transition temperature) of a polymer is determined according to ASTM D-3418 (1988).

Molecular weights Mw and Mn and the polydispersity (Mw/Mn) of the acrylic polymer and other polymers are determined by GPC (Gel Permeation Chromatography) using polystyrene standards and tetrahydrofuran as the solvent.

The following examples illustrate the invention. All parts and percentages are on a weight basis unless otherwise indicated. Abbreviation "PBW" means parts by weight.

EXAMPLES

Example 1

Polymer 150

Polymer 150 was prepared by charging the following constituents into a 12 liter reactor equipped with a stirrer, nitrogen inlet, condenser, dual above surface feeds and a heating source:

|  | PBW |
|---|---|
| Portion I. | |
| Xylene | 552.0 |
| Portion II. | |
| Styrene (Sty) monomer | 283.9 |
| Methyl methacrylate (MMA) monomer | 236.6 |
| Isobornyl methacrylate (IBOMA) monomer | 171.5 |
| Isobutyl methacrylate (IBMA) monomer | 207.0 |
| 2-Hydroxypropyl methacrylate (HPMA) monomer | 65.1 |
| 2-Hydroxy ethyl methacrylate (HEMA) monomer | 53.2 |
| 4-Hydroxy butyl acrylate (HBA) monomer | 165.6 |
| Portion III. | |
| t-Butyl peroxyacetate | 24.2 |
| Xylene | 118.3 |
| Portion IV. | |
| Methyl ethyl ketone | 118.3 |
| t-Butyl peroxyacetate | 4.5 |
| Total | 2000.0 |

Portion I was charged into the reactor and heated to its reflux temperature. The monomers of Portion II were premixed and added at a uniform rate to the reactor over a 180 minute period while maintaining the constituents in the reactor at its reflux temperature. Concurrently, Portion III, the initiator feed, is started and added with the monomers of Portion II at a uniform rate over the 180 minute period. After Portions II and III are added, Portion IV is added at an even rate over a 60 minute period. The resulting polymer solution is held at its reflux temperature for an additional 60 minutes and then cooled to room temperature. The resulting composition had a theoretical solids content of 59.7%.

The resulting Polymer 150 comprises Sty/MMA/IBOMA/IBMA/HPMA/HEMA/HBA in a weight ratio of 24.0/20.0114.5/17.515.514.5114.0 and has a GPC weight average molecular weight of 10,468 and a GPC number average molecular weight of 5215 and a Tg of 69° C. (theoretical).

Polymer 134

Polymer 134 was prepared by charging the following constituents into a 12 liter reactor equipped with a stirrer, nitrogen inlet, condenser, dual above surface feeds and a heating source:

|  | PBW |
|---|---|
| Portion I. | |
| Butyl acetate | 637.5 |
| Ethyl acetate | 112.5 |
| Portion II. | |
| Styrene (Sty) monomer | 474.8 |
| Methyl methacrylate (MMA) monomer | 237.4 |
| 4-Hydroxy butyl acrylate (HBA) monomer | 302.1 |
| n-Butyl methacrylate (BMA) monomer | 323.7 |
| 2-Hydroxypropyl methacrylate (HPMA) monomer | 237.4 |
| Isobornyl methacrylate (IBOMA) monomer | 582.7 |
| Portion III. | |
| 2,2'-azobis(2-ethylpropane nitrile) | 81.0 |
| t-Butyl peroxyacetate | 382.5 |
| Ethyl acetate | 67.5 |
| Portion IV. | |
| t-Butyl peroxyacetate | 200.0 |
| Total | 3639.0 |

Portion I was charged into the reactor and heated to its reflux temperature of about 110° C. The monomers of Portion II were premixed and added at a uniform rate to the reactor over a 300 minute period. Concurrently, Portion III, which was premixed, the initiator feed, was started and added with the monomers of Portion II at a uniform rate over a 330 minute period. After Portions II and III are added the resulting polymer solution is held at its reflux temperature for an additional 60 minutes and then cooled to room temperature and diluted with Portion IV. The resulting composition had a theoretical solids content of 60.4%.

The resulting Polymer 134 comprises Sty/MMA/BMA/HPMA/HBA/IBOMA in a weight ratio of 22/11/15/11/14/27 and has a GPC weight average molecular weight of 10,650 and a GPC number average molecular weight of 5670 and a Tg of 65° C. (theoretical).

Polymer 144

Polymer 144 was prepared by charging the following constituents into a reactor equipped with a stirrer, nitrogen inlet, condenser, dual above surface feeds and a heating source:

|  | PBW |
|---|---|
| Portion I. | |
| Xylene | 552.0 |
| Portion II. | |
| Styrene (Sty) monomer | 283.9 |
| Methyl methacrylate (MMA) monomer | 236.6 |
| Isobornyl methacrylate (IBOMA) monomer | 159.7 |
| Isobutyl methacrylate (IBMA) monomer | 207.1 |
| 2-Hydroxypropyl methacrylate (HPMA) monomer | 130.1 |
| 4-Hydroxy butyl acrylate (HBA) monomer | 165.6 |
| Portion III. | |
| t-Butyl peroxyacetate | 24.2 |
| Xylene | 118.3 |
| Portion IV. | |
| Methyl ethyl ketone | 118.3 |
| t-Butyl peroxyacetate | 4.5 |
| Total | 2000.0 |

Portion I was charged into a 12 liter reactor equipped as above and heated to its reflux temperature. The monomers of Portion II were premixed and added at a uniform rate to the reactor over a 180 minute period while maintaining a reflux temperature. Concurrently, Portion III, the initiator feed, was started and added with the monomers of Portion II at a uniform rate over the 180 minute period. After Portions II and III were added, Portion IV was added at an even rate over a 60 minute period. The resulting polymer solution was held at its reflux temperature for an additional 60 minutes and then cooled to room temperature.

The resulting Polymer 144 comprises Sty/MMA/IBOMA/HPMA/IBMA/HBA in a weight ratio of 24/20113.5/11/1 7.5/14 and has a GPC weight average molecular weight of 10,348 and a GPC number average molecular weight of 5174 and a Tg of 69° C. (theoretical).

The following coating compositions were prepared with the above prepared polymers 150, 134 and 144 and a comparative composition was prepared. The comparative composition used a polymer solution having a polymer of Sty/HEMA/IBMA/MMA in a weight ratio of 15120145/20, having a GPC weight average molecular weight of 16,806 and a GPC number average molecular weight of 7425. The weight solids for each of the above polymer solutions was 36.9%

| | Coating A | Coating B | Coating C | Comparative |
|---|---|---|---|---|
| Polymer 150 | 42.5 | | | |
| Polymer 134 | | 41.0 | | |
| Polymer 144 | | | 42.5 | |
| Comparative Polymer | | | | 42.8 |
| Methyl amyl ketone | 4.0 | 4.0 | 4.0 | 4.0 |
| Acetone | 20.0 | 21.2 | 19.7 | 21.0 |
| Methyl isobutyl ketone | 5.9 | 5.9 | 5.9 | 5.9 |
| Toluene | 1.3 | 1.3 | 1.3 | 1.3 |
| Tetrahyrdoxy functional oligomer* | 1.3 | 1.3 | 1.3 | 1.3 |
| Tinuvin ® 384-2* | 0.4 | 0.4 | 0.4 | 0.4 |
| Tinuvin ® 292* | 0.4 | 0.4 | 0.4 | 0.4 |
| BYK 358* | 0.3 | 0.3 | 0.3 | 0.3 |
| Byk 306* | 0.2 | 0.2 | 0.2 | 0.2 |
| Triethylene diamine solution (10% in xylene) | 0.2 | 0.2 | 0.2 | 0.2 |
| Glacial Acetic Acid | 0.09 | 0.09 | 0.09 | 0.09 |
| Dibutyl tin dilaurate (2% in ethyl acetate) | 0.6 | 0.6 | 0.6 | 0.6 |
| Desmodur ® N3360A (trimer of hexamethylene diisocyanate) | 9.9 | 10.0 | 10.0 | 9.2 |
| Butyl acetate | 6.5 | 6.6 | 6.6 | 6.2 |
| Xylene | 3.0 | 3.0 | 3.0 | 2.8 |
| Exxate 600* | 2.2 | 2.3 | 2.3 | 2.1 |
| Desmodur ® Z 4470BA (trimer of isophorone diisocyanate) | 1.2 | 1.2 | 1.2 | 1.2 |
| Total | 100.0 | 100.0 | 100.0 | 100.0 |

*Tinuvin ® 384-2 - substituted benzotriazol derivative, 95% in propylene glycol methyl ether acetate.
*Tinuvin ® 292 - bis(1,2,2,6,6-pentamethyl-4-piperidinyl) sebacate.
*Byk 358 - a solution of 52% acrylate copolymer in light aromatic naphtha.
*Byk 306 - silicone additive 12.5% solids in xylene/2-phenoxyethanol.
*Exxate 600 - acetic acid ester with C-6 rich oxo-alcohol - 99% min. purity (as ester) mixed isomers.
*Tetrahydroxy functional oligomer - prepared according to U.S. Pat. No. 6,221,494, col. 9 using Procedure 1.

The Pot Life time, Water Spot Free Finish Time and Swell Ratio were each determined on a finish of each of the above prepared coating compositions. Each of the above coating compositions were sprayed onto a primed steel panel and tested according to the above described test procedures and the results are shown in the following table:

| | Coating A Zhan Cup Viscosity | Coating B Zahn Cup Viscosity | Coating C Zahn Cup Viscosity | Comparative Zahn Cup Viscosity |
|---|---|---|---|---|
| Pot Life | | | | |
| Initial 0 | 15.1 | 14.8 | 15.1 | 14.9 |
| 30 min. | 15.7 | 15.1 | 15.3 | 15.3 |
| 60 min. | 15.7 | 15.4 | 15.5 | 15.4 |
| 90 min. | 16.0 | 15.7 | 15.8 | 15.6 |
| 120 min. | 16.1 | 16.0 | 16.1 | 16.2 |
| 150 min. | 16.5 | 16.4 | 16.8 | 16.2 |
| 180 min. | 17.5 | 16.8 | 16.9 | 16.3 |
| 210 min | 17.9 | 17.2 | 17.9 | 16.5 |
| 240 min. | 18.7 | 18.0 | 19.2 | 17.0 |
| Water Spot | | | | |
| 30 min. | 6 | 6 | 6 | 6 |
| 60 min. | 9 | 9 | 9 | 7.3 |
| 90 min. | 10 | 10 | 10 | 8.3 |
| 120 min. | 10 | 10 | 10 | 9 |
| 150 min. | 10 | 10 | 10 | 9.3 |
| 180 min. | 10 | 10 | 10 | 10 |
| 210 min. | 10 | 10 | 10 | 10 |
| 240 min. | 10 | 10 | 10 | 10 |
| Swell Ratio | | | | |
| 3 hrs. | 2.05 | 1.99 | 2.07 | 2.26 |
| 5 hrs. | 1.90 | 1.86 | 1.93 | 2.15 |
| 24 hrs | 1.65 | 1.64 | 1.67 | 1.77 |
| 48 hrs | 1.64 | 1.63 | 1.63 | 1.73 |
| 168 hrs. | 1.58 | 1.57 | 1.60 | 1.63 |

The Comparative Composition has a Pot Life of less than 2 seconds rise in 150 minutes as do Coating Compositions A–C. However, Water Spot Free Time is 180 minutes for Comparative Composition in comparison to 90 minutes for Compositions A–C. Swell Ratio for the Comparative Composition is higher than Compositions A–C especially at the early times of 3 and 5 hours—which indicates significant improvement in early cure. The Water Spot and Swell Ratio Tests show that Compositions A–C have significant improvement in early cure vs. the Comparative Composition while having a less than 2 second increase in Pot Life in 150 minutes.

Example 2

Oligomer (HEMA/HBA/IBOA-28.5/9.5/62)

An oligomer solution was prepared as follows: To a five-liter flask with heating mantle, stirrer, condenser with 50 ml moisture receiver, nitrogen blanket, monomer and initiator feed lines, enough solvent (Aromatic 100 from ExxonMobil Chemicals of Houston, Tex.) was added to completely fill the receiver. Then, 300 g of solvent (Aromatic 100) was added to the reaction flask and the flask heated to reflux. To this flask, a monomer mixture consisting of 427.5 g of 2-hydroxyethyl methacrylate (HEMA) (Rocryl® 400 from Rohm and Haas Company, Philadelphia, Pa.), 142.5 g of 4-hydroxybutyl acrylate (4-HBA from San Esters Corporation, New York, N.Y.), and 930 g isobornyl acrylate (IBOA) (Sipomer® HP from Rhodia Inc., Cranbury, N.J.) was added over a period of 240 minutes. Simultaneously with the monomer feed, an initiator mixture consisting of 45 g of tert-butyl peroxyacetate (Luperox® 7M75 from Atofina, Philadelphia, Pa.) and 250 g of Aromatic 100 was added over a period of 270 minutes. Reflux conditions were maintained throughout the initiator feed. After completion of the initiator feed, the system was cooled to 150° C. and 250 g of methyl amyl ketone were added. The flask was further cooled to less than 80° C. and the contents poured out.

The resulting oligomer solution had a 67.9% solids and the oligomer comprises HEMA/HBA/IBOA in a weight ratio of 28.519.5162 and has a GPC number average (Mn) of 1508 and GPC weight average (Mw) of 2749.

The following coating compositions were prepared. Coating D was prepared with the above oligomer and Polymer 150 of Example 1 and Comparative Composition II was prepared with the comparative polymer of Example 1 and the oligomer of Example 1.

|  | Coating D | Comparative II |
|---|---|---|
| Polymer 150 (described in Example 1) | 43.2 |  |
| Comparative Polymer (described in Example 1) |  | 42.8 |
| Oligomer (prepared above) | 1.6 |  |
| Tetrahydroxy functional Oligomer (described in Ex. 1) |  | 1.3 |
| Methyl amyl ketone | 4.0 | 4.0 |
| Acetone | 21.0 | 21.0 |
| Methyl isobutyl ketone | 5.9 | 5.9 |
| Toluene | 1.3 | 1.3 |
| Tinuvin ® 384-2 (described in Example 1) | 0.4 | 0.4 |
| Tinuvine ® 292 (described in Example 1) | 0.4 | 0.4 |
| Byk 358 (described in Ex. 1) | 0.3 | 0.3 |
| Byk 306 (described in Ex. 1) | 0.2 | 0.2 |
| Triethylene diamine solution (described in Ex. 1) | 0.2 | 0.2 |
| Glacial acetic acid | 0.09 | 0.09 |
| Dibutyl tin dilaurate solution (2% solids in ethyl acetate) | 0.6 | 0.6 |
| Desmodur ® N 3300A (trimer of hexamethylene diisocyanate) | 9.6 | 9.2 |
| Xylene | 2.9 | 2.8 |
| Butyl acetate | 4.8 | 6.2 |
| Exxate 600 (described in Example 1) | 2.2 | 2.1 |
| Desmodur ® Z 4470BA (described in Example 1) | 1.2 | 1.2 |

The Pot Life time, Water Spot Free Finish Time and Swell Ratio were each determined on a finish of each of the above prepared coating compositions. Each of the above coating compositions were sprayed onto a primed steel panel and tested according to the above described test procedures and the results are shown in the following table:

|  | Coating D Zhan Cup Viscosity | Comparative Coating II Zahn Cup Viscosity |
|---|---|---|
| Pot Life |  |  |
| Initial 0 | 14.62 | 14.88 |
| 30 min. | 14.85 | 14.53 |
| 60 min. | 15.06 | 14.59 |
| 90 min. | 15.28 | 14.86 |
| 120 min. | 15.56 | 14.91 |
| 150 min. | 15.84 | 14.94 |
| 180 min. | 16.50 | 15.21 |
| 210 min | 17.28 | 15.34 |
| 240 min. | 18.06 | 15.48 |
| Water Spot |  |  |
| 30 min. | 7.3 | 7 |
| 60 min. | 9 | 7.3 |
| 90 min. | 9.3 | 8.0 |
| 120 min. | 9.3 | 8.0 |
| 150 min. | 9.3 | 8.0 |
| 180 min. | 9.3 | 8.3 |
| 210 min. | 9.3 | 8.3 |
| 240 min. | 9.3 | 8.3 |
| Swell Ratio |  |  |
| 3 hrs. | 2.01 | 2.41 |
| 5 hrs. | 1.88 | 2.24 |
| 24 hrs | 1.68 | 1.84 |
| 168 hrs. | 1.52 | 1.69 |

Coating D has less than a 2 second rise in Pot Life at 180 minutes and has a significantly enhanced Water Spot Resistance at 60 minutes and considerably improved Swell Ratio at 3 and 5 hours in comparison to Comparative Coating II. These indicate improved early cure of Coating D while maintaining good Pot Life.

What is claimed is:

1. A two-stage cure coating composition comprising a binder and a crosslinking component, wherein said binder comprises (1) an acrylic polymer having weight average molecular weight of 3,000 to 50,000 and having in the range of 7.0 weight percent to 40.0 weight percent, based on the weight of the acrylic polymer, of hydroxyl moieties wherein 40.0 to 70.0 weight percent of the hydroxyl moieties are provided by hydroxy butyl acrylate and the remaining hydroxyl moieties are provided by fast reacting hydroxyl constituents selected from the group consisting of hydroxy ethyl acrylate, hydroxy ethyl methacrylate and any mixtures thereof and by slow reacting hydroxyl constituents selected from the group consisting of secondary hydroxyl containing hydroxy propyl acrylate and secondary hydroxyl containing hydroxy propyl methacrylate and any mixtures thereof; and (2) the binder further comprises in the range of 1 to 20 percent by weight, based on the weight of the binder, of at least one acrylic oligomer having a weight average molecular weight in the range of 100 to 3,000, a polydispersity of 1.01 to 1.7 and one or more reactive functionalities reactive with isocyanate groups and said crosslinking component comprises an organic polyisocyanate having at least two reactive isocyanate groups and wherein the first stage curing of a finish of the composition on a substrate forms a water spot free finish within 90 minutes of application and wherein the composition has a pot life, measured at 25° C. on a composition having 38% solids of binder and crosslinking component, of less than a 2 second rise in Zahn cup viscosity in 150 minutes.

2. The coating composition of claim 1 wherein the acrylic polymer is a linear polymer having a weight average molecular weight in the range of 3,000 to 30,000 and a Tg in the range of −20° to 100° C.

3. The coating composition of claim 1 wherein the acrylic polymer is a branched polymer having a weight average molecular weight in the range of 3,000 to 30,000 and a Tg in the range of −20° to 100° C.

4. The coating composition of claim 1 wherein the binder contains organic solvent for the binder.

5. The coating composition of claim 1 wherein the organic polyisocyanate is selected from the group consisting of aliphatic isocyanates, aromatic isocyanates, cycloaliphatic isocyanates, trifunctional isocyanates and isocyanate functional adducts.

6. A two-stage cure coating composition comprising a binder and a crosslinking component,
wherein said binder comprises (1) an acrylic polymer comprising a core-shell polymer having an insoluble core and a soluble shell attached to the core comprising polymer arms, said shell containing the majority of the hydroxyl groups of the polymer, wherein the core having a weight average molecular weight of 50,000 to 500,000 and the arms having a weight average molecular weight of 1,000 to 50,000 and wherein the acrylic polymer having in the range of 7.0 weight percent to 40.0 to weight percent, based on the weight of the acrylic polymer, of hydroxyl moieties wherein 40.0 to 70 weight percent of the hydroxyl moieties are provided by hydroxy butyl acrylate and the remaining hydroxyl moieties are provided by fast reacting hydroxyl constituents selected from the group consisting of hydroxy ethyl acrylate, hydroxy ethyl methacrylate and any mixtures thereof and by slow reacting hydroxyl constituents selected from the group consisting of secondary hydroxyl containing hydroxy propyl acrylate and secondary hydroxyl containing hydroxy propyl methacrylate and any mixtures thereof; and (2) the binder further comprises in the range of 1 to 20 percent by weight, based on the weight of the binder, of at least one acrylic oligomer having a weight average molecular weight in the range of 100 to 3,000, a polydispersity of 1.01 to 1.7 and one or more reactive functionalities reactive with isocyanate groups and; and said crosslinking component comprises an organic polyisocyanate having at least two reactive isocyanate groups and
wherein the first stage curing of a finish of the composition on a substrate forms a water spot free finish within 90 minutes of application and wherein the composition has a pot life, measured at 25° C. on a composition having 38% solids of binder and crosslinking component, of less than a 2 second rise in Zahn cup viscosity in 150 minutes.

7. A method of producing a finish on a substrate utilizing a two component coating composition; wherein the method comprises the following steps:
 a. Forming a two stage cure coating composition by mixing together a binder component of the coating composition and a cross-linking component of the composition comprising an organic polyisocyanate, wherein the binder component comprises (1) an acrylic polymer having weight average molecular weight of 3,000 to 50,000 and having in the range of 7.0 to 40.0 weight percent, based on the weight of the acrylic polymer, of hydroxyl moieties wherein 40.0 to 70 weight percent of the hydroxyl moieties are provided by hydroxyl butyl acrylate and the remaining hydroxyl moieties are provided by fast reacting hydroxyl constituents selected from the group consisting of hydroxy ethyl acrylate, hydroxy ethyl methacrylate and any mixtures thereof and by slow reacting hydroxyl constituents selected from the group consisting of secondary hydroxyl containing hydroxy propyl acrylate and secondary hydroxyl containing hydroxy propyl methacrylate and any mixtures thereof; and (2) the binder further comprises in the range of 1 to 20 percent by weight, based on the weight of the binder, of at least one acrylic oligomer having a weight average molecular weight in the range of 100 to 3,000, a polydispersity of 1.01 to 1.7 and one or more reactive functionalities reactive with isocyanate groups and;
 wherein the composition has a pot life, measured on a composition having 38% solids of binder and crosslinking component at 25° C. of less than a 2 second rise in Zahn cup viscosity in 150 minutes;
 b. Applying a layer of the coating composition to the substrate;
 c. First stage curing the layer of the coating composition on the substrate to a water spot free finish within 90 minutes of application; and
 d. Second stage curing the first stage cured layer into a finish on the substrate having excellent appearance and excellent physical properties.

8. The method of claim 7 wherein the acrylic polymer is a linear polymer having a weight average molecular weight in the range of 3,000 to 30,000 and a Tg in the range of −20° to 100° C.

9. The method of claim 7 wherein the acrylic polymer is a branched polymer having a weight average molecular weight in the rang of 3,000 to 30,000 and a Tg in the range of −20° to 100° C.

10. The method of claim 7 wherein the binder contains organic solvent for the binder.

11. The method of claim 7 wherein the organic polyisocyanate is selected from the group consisting of aliphatic isocyanates, aromatic isocyanates, cycloaliphatic isocyanates, trifunctional isocyanates and isocyanate functional adducts.

12. A method of producing a finish on a substrate utilizing a two component coating composition; wherein the method comprises the following steps:
 a. Forming a two stage cure coating composition by mixing together a binder component of the coating composition and a cross-linking component of the composition comprising an organic polyisocyanate, wherein the binder component comprises (1) an acrylic polymer comprising a core-shell polymer having an insoluble core and a soluble shell attached to the core comprising polymer arms, said shell containing the majority of the hydroxyl groups of the polymer, wherein the core having a weight average molecular weight of 50,000 to 500,000 and the arms having a weight average molecular weight of 1,000 to 50,000 and wherein the acrylic polymer having in the range of 7.0 to 40.0 weight percent, based on the weight of the acrylic polymer, of hydroxyl moieties wherein 40.0 to 70 weight percent of the hydroxyl moieties are provided by hydroxyl butyl acrylate and the remaining hydroxyl moieties are provided by fast reacting hydroxyl constituents selected from the group consisting of hydroxy ethyl acrylate, hydroxy ethyl methacrylate and any mixtures thereof and by slow reacting hydroxyl constituents selected from the group consisting of secondary hydroxyl containing hydroxy propyl acrylate and secondary hydroxyl containing hydroxy propyl methacrylate and any mixtures thereof; and (2) the binder further comprises in the range of 1 to 20 percent by weight, based on the weight of the binder, of at least one acrylic oligomer having a weight average molecular weight in the range of 100 to 3,000, a polydispersity of 1.01 to 1.7 and one or more reactive functionalities reactive with isocyanate groups and; wherein the composition has a pot life, measured on a composition having 38% solids of binder and crosslinking component at 25° C. of less than a 2 second rise in Zahn cup viscosity in 150 minutes;

b. Applying a layer of the coating composition to the substrate;

c. First stage curing the layer of the coating composition on the substrate to a water spot free finish within 90 minutes of application; and d. Second stage curing the first stage cured layer into a finish on the substrate having excellent appearance and excellent physical properties.

13. A substrate coated with a layer of the cured coating composition of claim 1.

14. A substrate coated with a layer of the cured coating composition of claim 7.

15. The two stage cure coating composition of claim 1 wherein the binder comprises 30–90% by weight, based on the weight of the binder, of the acrylic polymer and complementary 10–70% by weight, based on the weight of the binder, of a second acrylic polymer.

16. The two stage cure coating composition of claim 6 wherein the binder comprises 30–90% by weight, based on the weight of the binder, of the acrylic polymer comprising a core-shell polymer and complementary 10–70% by weight, based on the weight of the binder, of a second acrylic polymer.

17. The method of claim 7 wherein the binder comprises 30–90% by weight, based on the weight of the binder of the acrylic polymer and complementary 10–70% by weight, based on the weight of the binder, of a second acrylic polymer.

18. The method of claim 12 wherein the binder comprises 30–90% by weight, based on the weight of the binder of the acrylic polymer comprising a core-shell polymer and complementary 10–70% by weight, based on the weight of the binder, of a second acrylic polymer.

* * * * *